US00RE44556E

(19) United States
(12) Reissued Patent
Minich et al.

(10) Patent Number: US RE44,556 E
(45) Date of Reissued Patent: Oct. 22, 2013

(54) ELECTRICAL POWER CONNECTOR

(75) Inventors: Steven E. Minich, York, PA (US); Christopher J. Kolivoski, Lewisberry, PA (US)

(73) Assignee: FCI Americas Technology LLC, Carson City, NV (US)

(21) Appl. No.: 12/317,366

(22) Filed: Dec. 22, 2008

Related U.S. Patent Documents

Reissue of:
(64) Patent No.: 7,168,963
Issued: Jan. 30, 2007
Appl. No.: 11/414,062
Filed: Apr. 27, 2006

U.S. Applications:
(62) Division of application No. 10/969,166, filed on Oct. 17, 2004, now Pat. No. 7,065,871, which is a division of application No. 10/155,819, filed on May 23, 2002, now Pat. No. 6,814,590.

(51) Int. Cl.
*H01R 12/00* (2006.01)

(52) U.S. Cl.
USPC ..... 439/79

(58) Field of Classification Search
USPC ..... 439/79, 80, 884
See application file for complete search history.

(56) References Cited

U.S. PATENT DOCUMENTS

| | | | | |
|---|---|---|---|---|
| 4,790,763 | A | 12/1988 | Weber et al. | 439/65 |
| 4,818,237 | A | 4/1989 | Weber | 439/693 |
| 4,820,169 | A | 4/1989 | Weber et al. | 439/65 |
| 4,821,146 | A | 4/1989 | Behrens et al. | 361/383 |
| 4,975,084 | A | 12/1990 | Fedder et al. | 439/608 |
| 5,046,960 | A | 9/1991 | Fedder | 439/108 |
| 5,139,426 | A | 8/1992 | Barkus et al. | 439/65 |
| 5,152,700 | A | 10/1992 | Bogursky et al. | 439/733 |
| 5,286,212 | A | 2/1994 | Broeksteeg | 439/108 |
| 5,458,426 | A | 10/1995 | Ito | 439/274 |
| 5,511,987 | A | 4/1996 | Shinchi | 439/205 |

(Continued)

FOREIGN PATENT DOCUMENTS

| | | |
|---|---|---|
| JP | 05-344728 | 12/1993 |
| JP | 2000228243 A | 8/2000 |

OTHER PUBLICATIONS

1. Patent Abstracts of Japan, JP05-344728, Dec. 24, 1993, 1 page.

(Continued)

*Primary Examiner* — Phuong Dinh
(74) *Attorney, Agent, or Firm* — Harrington & Smith

(57) ABSTRACT

A printed circuit board electrical power contact for connecting a daughter printed circuit hoard to a mating contact on another electrical component. The power contact includes a main section; at least one daughter board electrical contact section extending from the main section; and at least one mating connector contact section extending from the main section. The mating connector contact section includes at least three forward projecting beams. A first one of the beams extends outward in a first direction as the first beam extends forward from the main section and has a contact surface facing the first direction. Two second ones of the beams are located on opposite sides of the first beam and extend outward in a second opposite direction as the second beams extend forward from the main section. The second beams have contact surfaces facing the second direction.

21 Claims, 15 Drawing Sheets

(56) References Cited

U.S. PATENT DOCUMENTS

| | | | | |
|---|---|---|---|---|
| 5,564,952 | A | 10/1996 | Davis | 439/682 |
| 5,664,968 | A | 9/1997 | Mickievicz | 439/608 |
| 5,667,392 | A | 9/1997 | Kocher et al. | 439/79 |
| 5,782,644 | A | 7/1998 | Kiat | 439/79 |
| 5,882,214 | A | 3/1999 | Hillbish et al. | 439/79 |
| 6,041,498 | A | 3/2000 | Hillbish et al. | 29/883 |
| 6,066,048 | A | 5/2000 | Lees | 470/110 |
| 6,206,722 | B1 | 3/2001 | Ko et al. | 439/417 |
| 6,261,132 | B1 | 7/2001 | Koseki et al. | 439/733.1 |
| 6,319,075 | B1 | 11/2001 | Clark et al. | 439/825 |
| 6,514,103 | B2 | 2/2003 | Pape et al. | 439/608 |
| 6,768,643 | B1 * | 7/2004 | Rust et al. | 361/732 |
| 6,814,590 | B2 * | 11/2004 | Minich et al. | 439/79 |
| 6,923,685 | B2 | 8/2005 | Holmes et al. | 439/660 |
| 2002/0031925 | A1 | 3/2002 | Clark et al. | |
| 2002/0034889 | A1 | 3/2002 | Clark et al. | |
| 2008/0248670 | A1 | 10/2008 | Daily et al. | 439/290 |

OTHER PUBLICATIONS

"Metral® 1000 Series, PCB Mounted Receptacle Assembly", FCI Web Site page, Nov. 26, 2001, 1 pg.

Metral® 1000 Series, PCB Mounted Receptacle Assembly, FCI Web Site page, 1 p.

Metral® 1000 Series, PCB Mounted Header Assembly, FCI Web Site page, 1 p.

* cited by examiner

ELECTRICAL POWER CONNECTOR

Matter enclosed in heavy brackets [ ] appears in the original patent but forms no part of this reissue specification; matter printed in italics indicates the additions made by reissue.

CROSS REFERENCE TO RELATED APPLICATION

This is a divisional patent application of [co-pending] U.S. patent application Ser. No. 10/969,166 filed Oct. 17, 2004, now U.S. Pat. No. 7,065,871, which is a divisional patent application of U.S. patent application Ser. No. 10/155,819 filed May 23, 2002, now U.S. Pat. No. 6,814,590.

BACKGROUND OF THE INVENTION

1. Field of the Invention

The present invention relates to electrical connectors and, more particularly, to electrical power connectors used to supply power to a printed circuit board.

2. Brief Description of Prior Developments

FCI USA, Inc. manufactures and sells printed circuit board power and signal connectors known as PwrBlade™ in a connection system. An example of the PwrBlade™ connector can be seen in U.S. Pat. No. 6,319,075. FCI USA, Inc. also manufactures and sells high-speed signal connectors known as Metral™. There is a desire to provide a printed circuit board power connector which can be stacked alongside a Metral™ connector, or a similar connector, such as the connector shown in U.S. Pat. No. 5,286,212 or a Future-Bus™ connector.

There is also a desire to increase amperage density of printed circuit board power connectors. For example, there is a desire to increase amperage density to about 60 amps per half inch in a card-to-back panel interface. Connector specifications for secondary circuits in card-to-back panel interfaces, such as standards for clearance and creepage for a given Voltage, also exist such as in UL 60950, IEC 61984 and IEC 664-1. There is a desire to provide a printed circuit board power connector system which can meet these standards for higher voltage connections, such as 150 volts or more for example.

SUMMARY OF THE INVENTION

In accordance with one aspect of the present invention, a printed circuit board electrical power contact for connecting a daughter printed circuit board to a mating contact on another electrical component is provided. The power contact includes a main section; at least one daughter board electrical contact section extending from the main section; and at least one mating connector contact section extending from the main section. The mating connector contact section includes at least three forward projecting beams. A first one of the beams extends outward in a first direction as the first beam extends forward from the main section and has a contact surface facing the first direction. Two second ones of the beams are located on opposite sides of the first beam and extend outward in a second opposite direction as the second beams extend forward from the main section. The second beams have contact surfaces facing the second direction. These second beams are preferably one half the width of the first beam so overall normal force is equal in each direction.

In accordance with another aspect of the present invention, a system for connecting a daughter printed circuit board to a mother printed circuit board is provided. The system comprises a first power connector adapted to be mounted to the mother printed circuit board. The first power connector has a first housing and first power contacts. The system comprises a second power connector adapted to be mounted to the daughter printed circuit board. The second power connector has second power contacts with substantially flat main sections and outwardly bent contact beams having outward facing contact areas. The second power contacts are adapted to be inserted into the first housing. The system comprises a first signal connector adapted to be mounted to the mother printed circuit board. The first signal connector comprises male signal contacts. The system comprises a second signal connector adapted to be mounted to the daughter printed circuit board. The second signal connector comprises female signal contacts adapted to receive the male signal contacts therein.

In accordance with one method of the present invention, a method of manufacturing electrical power connectors is provided comprising manufacturing a first type of electrical power terminal from a metal stock material by use of a metal stamping die; inserting an insert tooling punch into the metal stamping die; stamping a second electrical power terminal and a third electrical power terminal substantially simultaneously from the metal stock material when the insert tooling punch is located in the metal stamping die; inserting the first type of electrical power terminal into a first housing to form a first type of electrical power connector, and inserting the second and third types of electrical power terminals into a second housing to form a second type of electrical power connector. The metal stamping die, and optional insertion of the insert tooling punch into the metal stamping die, can be used to form the three different electrical power terminals and subsequently form the two different types of electrical power connectors.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
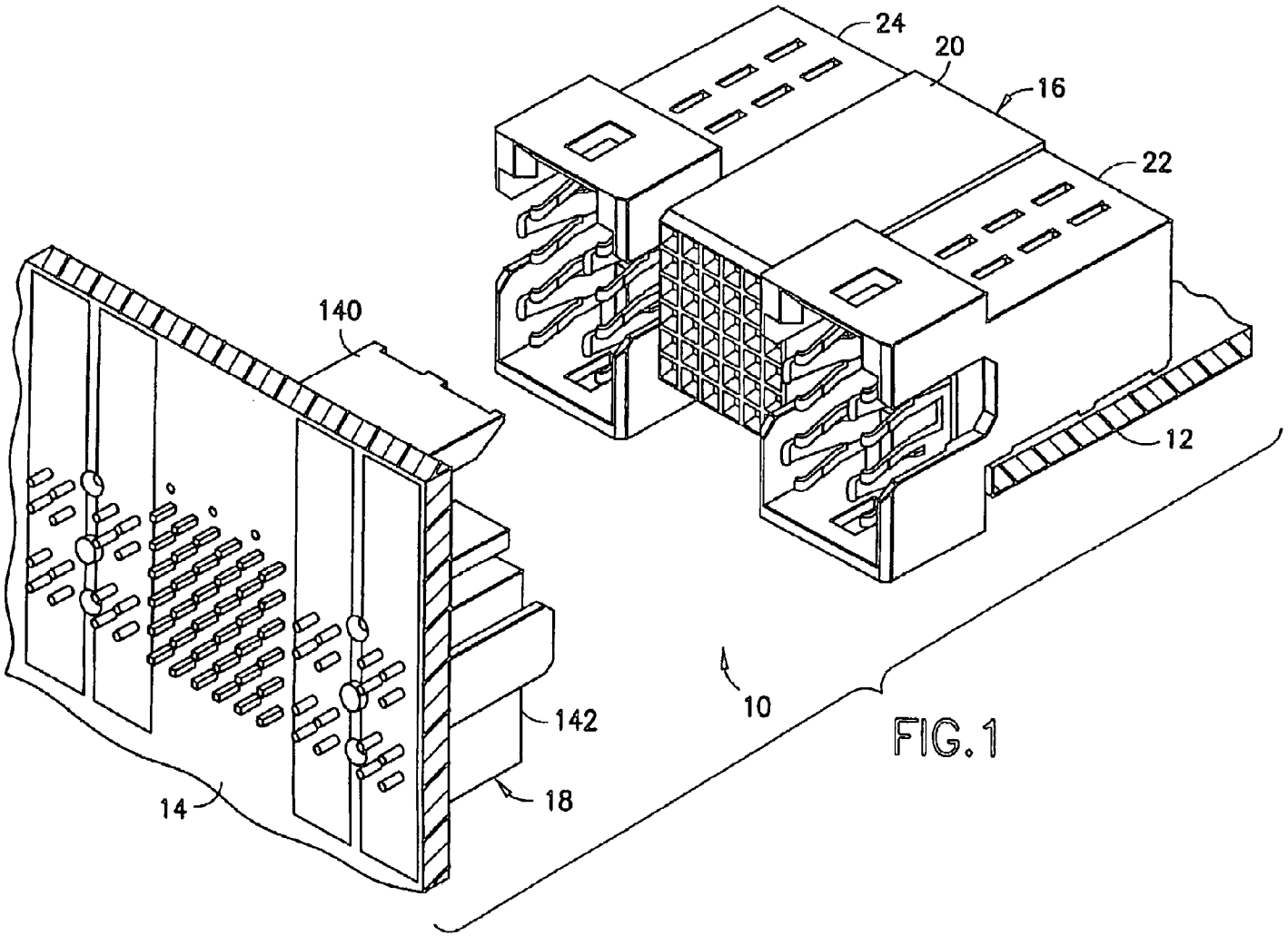
FIG. 1 is a perspective view of a connector system incorporating features of the present invention and portions of a daughter printed circuit board and a mother printed circuit board.
Figure 2:
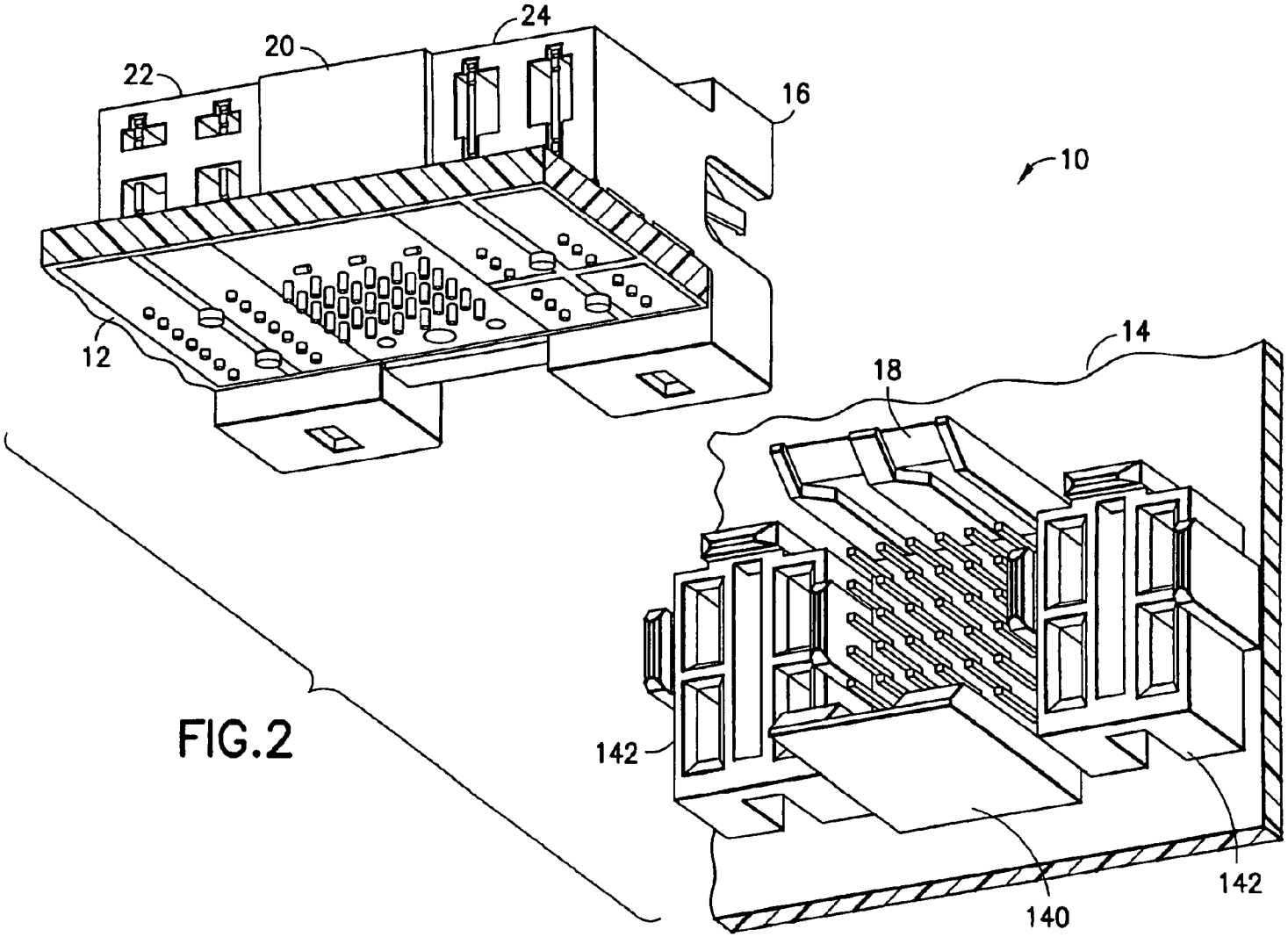
FIG. 2 is a perspective view of the connector system shown in FIG. 1 from an opposite angle.

Referring to FIGS. 1 and 2, there are shown perspective views of a connection system 10 incorporating features of the present invention for removably connecting a daughter printed circuit board 12 to a back panel or mother printed circuit board 14. In alternate embodiments, features of the present invention could be used to connect the daughter printed circuit board to any suitable type of electrical component. Although the present invention will be described with reference to the exemplary embodiments shown in the drawings, it should be understood that the present invention can be embodied in many alternate forms of embodiments. In addition, any suitable size, shape or type of elements or materials could be used.

The connection system 10 generally comprises a daughter board connection section 16 and a mother board connection section 18. The daughter board connection section 16 generally comprises a signal connector 20, a first power connector 22, and a second power connector 24. In the embodiment shown, the three connectors 20, 22, 24 are shown stacked adjacent each other with the signal connector 20 located between the two power connectors 22, 24.

The signal connector 20 generally comprises a housing with a plurality of female signal contacts and possibly ground contacts therein. In a preferred embodiment, the signal connector 20 comprises a Metral™ receptacle connector manufactured and sold by FCI USA, Inc.

The present invention relates to a high power connector system for power-to-daughter card applications. For example, the system can be used to supply 150 Volts or more. Three power connectors will be described below; namely, a 1×2 right angle header, a 2×2 right angle header, and a 2×2 vertical receptacle that will work with both headers.

One of the features of the present invention is the ability to stack the power connectors adjacent to the signal connectors and the modularity of the connector system. For example, a connection section could be provided with two of the first type of connectors 22 located on opposite sides of the signal connector 20 or, with two of the second type of connectors 24 located on opposite sides of the signal connector 20. The present invention also allows a single type of mother board power connector 142 to be used which can be connected to either the first type of connector 22 or the second type of connector 24.

Figure 7:
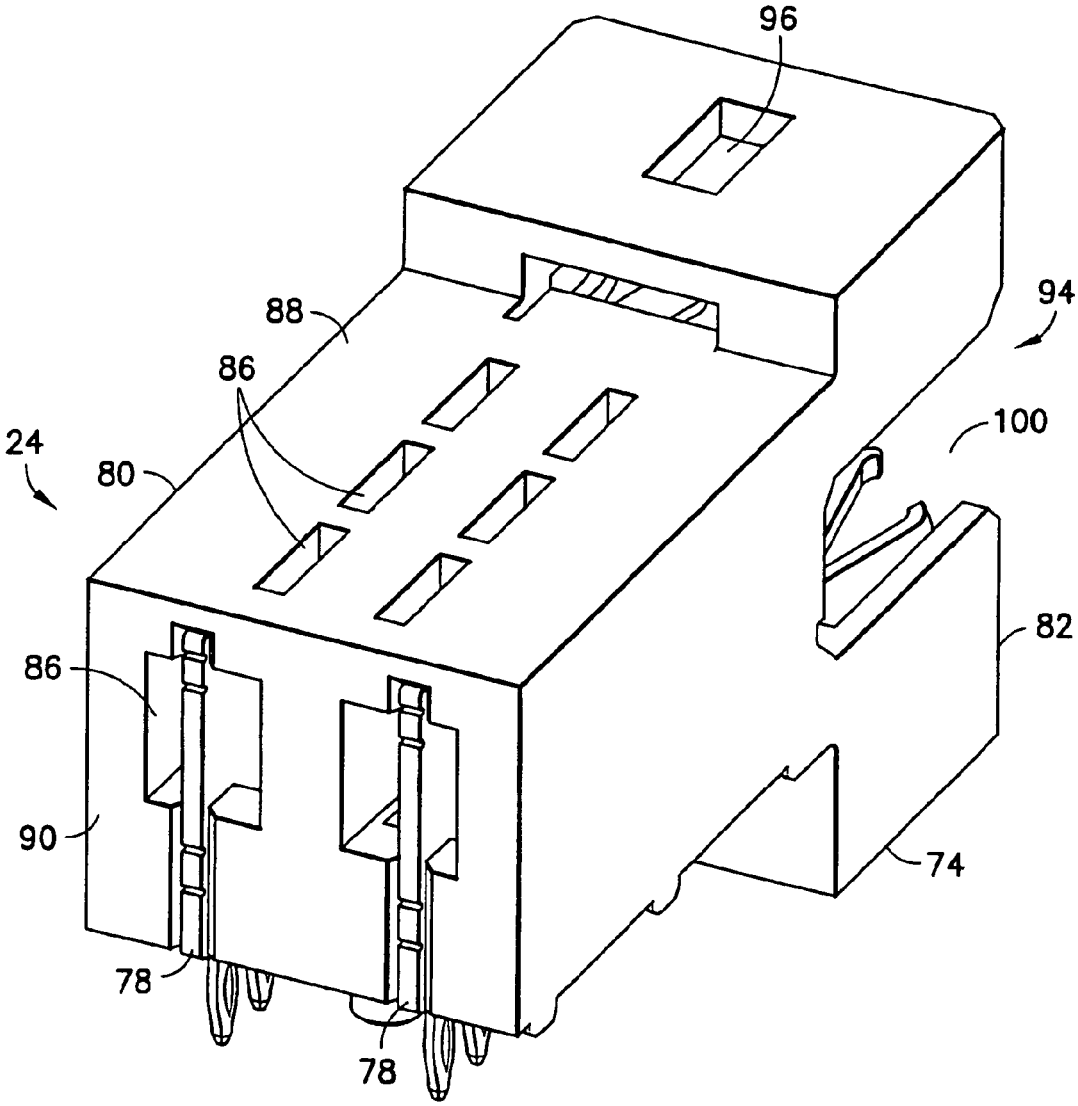
FIG. 7 is a perspective view of the second type of power connector shown in FIG. 6 taken from a generally opposite angle.

Another feature of the present invention is the increased amperage density which can be provided by the power connectors. For example, the second type of connector 24 can provide for 15 amps of current per contact for a total of 60 amps per connector. The bottom side of the connector 24 can be as small as a half-inch, for example, such that the amperage density can be provided at about 60 amps per half inch. This increased amperage density, relative to conventional designs, can be provided due to the higher conductivity of the high performance copper alloy and, due to the increased air flow through the connector housings 26, 74, 144 (see FIGS. 4, 7 and 10).

Another feature of the present invention is the ability for the power connectors to meet specification standards for a given voltage for secondary circuit power card-to-back panel interfaces. More specifically, it has been found that implementation of the present invention can meet the specifications for UL 60950, IEC 61984 and IEC 664-1 for a 150-160 Volt secondary circuit power card-to-back panel connection.

Figure 3:
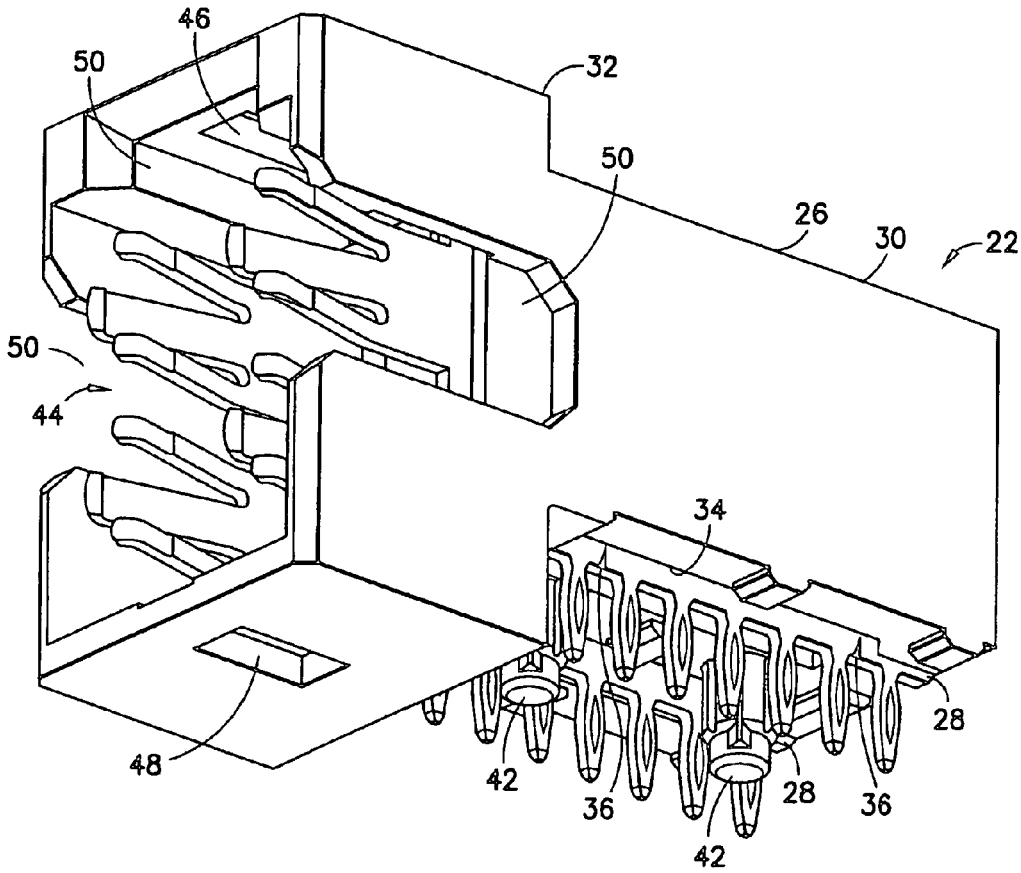
FIG. 3 is a perspective view of the first type of power electrical connector shown in FIG. 1.
Figure 4:
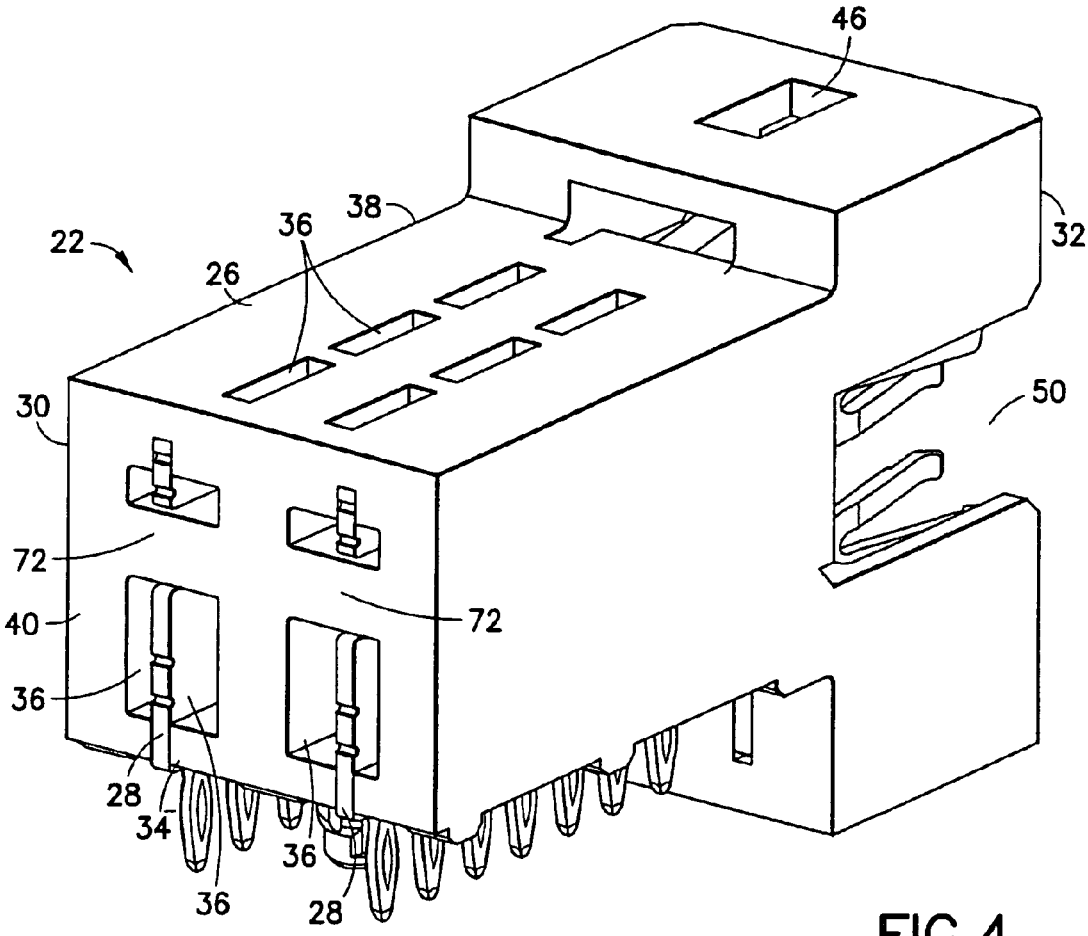
FIG. 4 is a perspective view of the first type of power electrical connector shown in FIG. 3 taken from an opposite angle.
Figure 5:
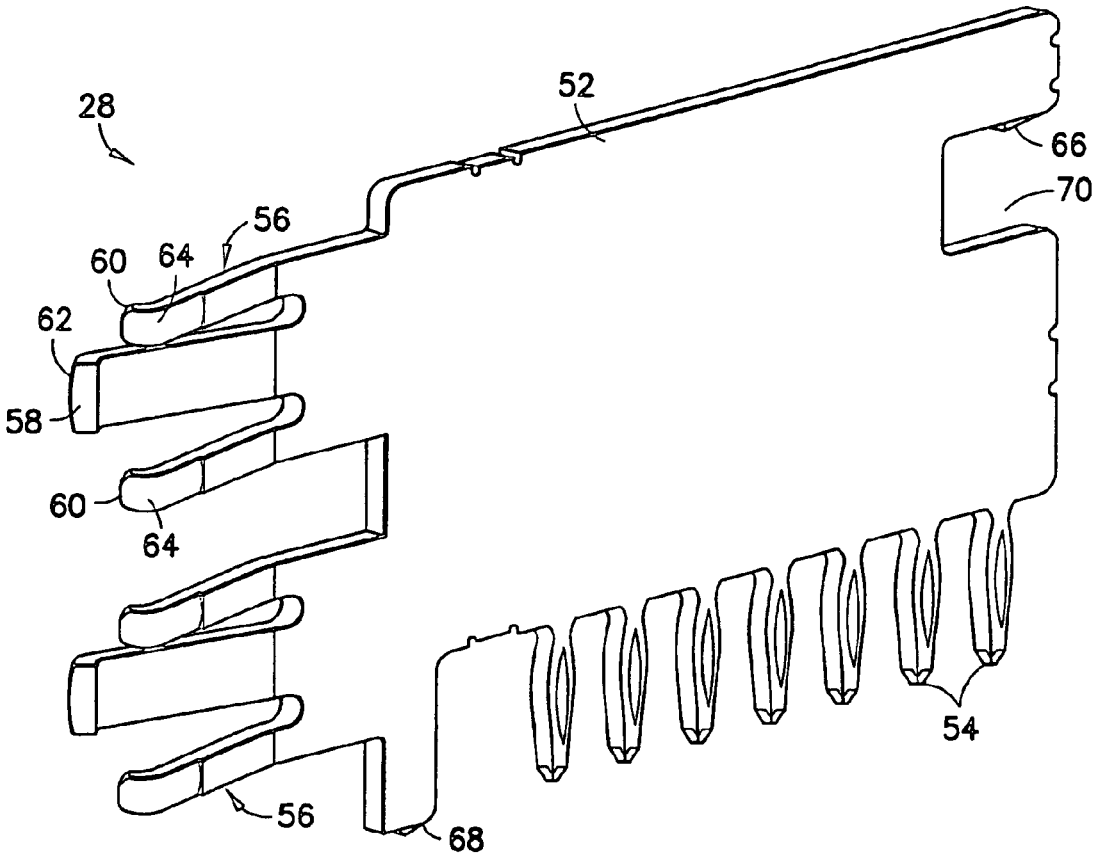
FIG. 5 is a perspective view of a first type of the electrical power contact used in the connector shown in FIG. 3.
Figure 6:
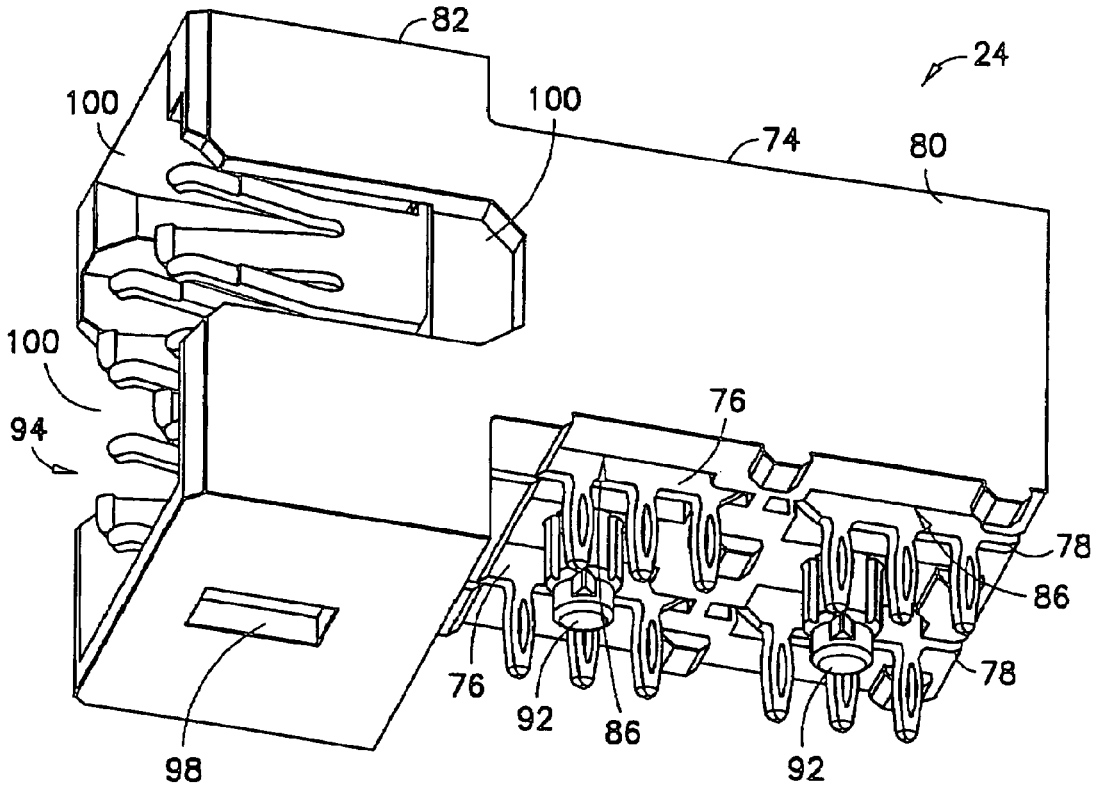
FIG. 6 is a perspective view of the second type of power electrical connector shown in FIG. 1.

Referring also to FIGS. 3-5, the first power connector 22 generally comprises a housing 26 and two electrical power contacts or terminals 28. The housing 26 is preferably comprised of a molded plastic or polymer material. The housing 26 generally comprises a rear section 30 and a front section 32. The rear section 30 generally comprises contact mounting areas 34 formed along air flow passages 36. In the embodiment shown, the air flow passages 36 form a majority of a cross sectional size of the rear section 30.

The air flow passages 36 comprise holes through a top side 38 and a rear side 40 and bottom side of the rear section 30. The bottom side of the rear section 30 includes mounting posts 42 for mounting the housing on the daughter printed circuit board 12. However, in alternate embodiments, any suitable means for mounting the housing 26 on the daughter printed circuit board could be provided.

The front section 32 generally comprises a mating connector receiving area 44, air passage holes 46, 48 at top and bottom sides of the front section, and mating connector aligner receiving grooves 50. The mating connector receiving area 44 is sized and shaped to receive a portion of a mating connector of the mother board connection section 18. The mating connector aligner receiving grooves 50, in the embodiment shown, are located on a top side and two lateral sides of the front section 32. The air passage holes 46, 48 are provided to allow air to flow into and out of the mating connector receiving area 44.

The power contacts 28, in the embodiment shown, are identical to each other. However, in alternate embodiments, the power contacts could be different from one another. The embodiment shown comprises two of the power contacts 28. In alternate embodiments the power connector could comprise more than two power contacts. As seen best in FIG. 5, each power contact 28 generally comprises a main section 52, daughter board electrical contact sections 54, and mating connector contact sections 56. The power contact 28 comprises two of the mating connector contact sections 56. However, in alternate embodiments, the power contact 28 could comprise more or less than two of the mating connector contact sections.

The power contact 28 is preferably comprised of a one-piece metal member which has been stamped and subsequently plated; at least at some of its contact surfaces. The power contact 28 is substantially flat except at the mating connector contact sections 56. In the embodiment shown, the daughter board electrical contact sections 54 comprise a plurality of through-hole contact tails. However, in alternate embodiments, any suitable type of daughter board electrical contact sections could be provided.

The main section 52 comprises a first retention section 66 located at a rear end of the main section and a second retention section 68 extending from a bottom side of the main section. The retention sections 66, 68 engage with the housing 26 to fixedly hold the main section 52 in the housing. However, in alternate embodiments, any suitable system for retaining the power contacts with the housing could be provided. The main section 52 comprises a recess 70 at the first retention section 66. A crossbar 72 at the rear end of the housing 26 is received in the recess 70. In the embodiment shown, the contacts 28 are loaded into the housing 26 through the front end of the housing; through the mating connector receiving area 44.

The mating connector contact sections 56 are substantially identical to each other. However, in alternate embodiments, the mating connector contact sections could be different from each other. Each mating connector contact section 56 generally comprises three forward projecting cantilevered beams; a first beam 58 and two second beams 60. However, in alternate embodiments, the mating connector contact section could comprise more or less than three cantilevered contact beams.

The first beam 58 extends outward in a first direction as the first beam extends forward from the main section 52. The first beam 58 has a contact surface 62 facing outward in the first direction. The second beams 60 are located on opposite top and bottom sides of the first beam 58. The second beams 60 extend outward in a second opposite direction as the second beams extend forward from the main section 52. The second beams 60 have contact surfaces 64 facing outward in the second direction.

The beams 58, 60 are bent outward about 15 degrees from a central plain of the power contact. However, in alternate embodiments, any suitable angle could be provided. In the embodiment shown, the front ends of the beams 58, 60 are curved inward and also comprise coined surfaces on their outer contact surfaces 62, 64. When the power contacts are inserted into the housing 26, the mating connector contact sections 56 are located in the mating connector receiving area 44.

In a preferred embodiment, the power contact is comprised of a highly conductive high-performance copper alloy material. Some high performance copper alloy materials are highly conductivity material. One example of a highly conductive high-performance copper alloy material is sold under the descriptor C18080 by Olin Corporation. However, in alternate embodiments, other types of materials could be used. A highly conductive high-performance copper alloy material may have a minimum bend radius to material thickness ratio (R/T) of greater than one; whereas common conventional metal conductors may have a R/T of less than ½. However, a highly conductive high performance copper alloy material may not be as malleable as other common electrically conductive materials used for electrical contacts. Thus, an electrical contact formed with a highly conductive high-performance copper alloy material may be more difficult to form in conventional contact stamping and forming dies.

Referring also to FIGS. 6-9, the second power connector 24 generally comprises a housing 74 and four electrical power contacts or terminals 76, 78. The housing 74 is preferably comprised of a molded plastic or polymer material. The housing 74 generally comprises a rear section 80 and a front section 82. The rear section 80 generally comprises contact mounting areas 84 formed along air flow passages 86.

In the embodiment shown, the air flow passages 86 form a majority of a cross sectional size of the rear section 80. The air flow passages 86 comprise holes through a top side 88 and a rear side 90 and bottom side of the rear section 80. The bottom side of the rear section 80 includes mounting posts 92 for mounting the housing on the daughter printed circuit board 12. In the embodiment shown, the housing 74 is substantially the same as the housing 26 except for the shape of the contact mounting areas 84.

The front section 82 is identical to the front section 32. However, in alternate embodiments, the front section 82 could comprise a different shape. The front section 82 generally comprises a mating connector receiving area 94, air passage holes 96, 98 at top and bottom sides of the front section, and mating connector aligner receiving grooves 100. The mating connector receiving area 94 is sized and shaped to receive a portion of a mating connector of the mother board connection section 18. The mating connector aligner receiving grooves 100, in the embodiment shown, are located on a top side and two lateral sides of the front section 82. The air passage holes 96, 98 are provided to allow air to flow into and out of the mating connector receiving area 94.

As noted above, the connector 24 comprises four power contacts 76, 78. However, in alternate embodiments, the connector could comprise more or less than four power contacts. The power contacts are provided in two sets, each set comprising a second type of contact 76 and a third type of contact 78. The two contacts in each set are aligned with each other in a same plane as an upper contact and a lower contact.

The second and third types of power contacts 76, 78 are each preferably comprised of a one-piece metal member which has been stamped and subsequently plated. The power contact 76, 78 are substantially flat except at their mating connector contact sections. In the embodiment shown, the daughter board electrical contact sections comprise a plurality of through-hole contact tails.

Figure 8:
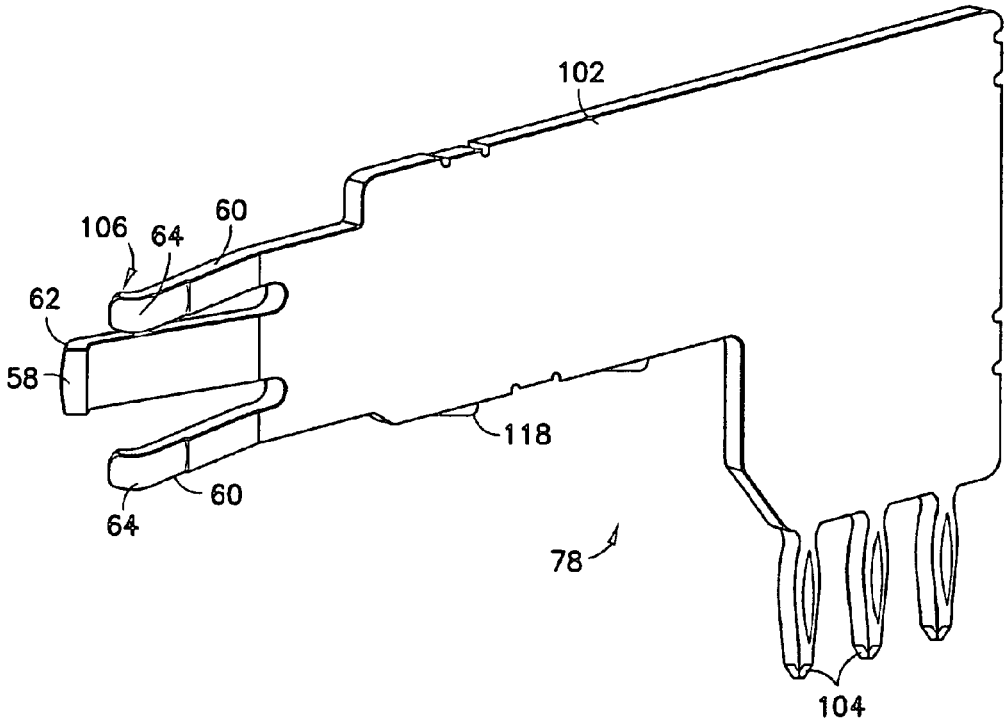
FIG. 8 is a perspective view of a second type of electrical power contact used in the connector shown in FIG. 6.

As seen best in FIG. 8, each second type of power contact 78 generally comprises a main section 102, daughter board electrical contact sections 104, and mating connector contact section 106. The power contact 78 comprises only one mating connector contact section 106. However, in alternate embodiments, the second type of power contact 78 could comprise more than one mating connector contact section.

The main section 102 comprises a retention section 118 located at a bottom side of the main section. The retention sections engage with the housing 26 to fixedly hold the main section 102 in the housing. In the embodiment shown, the contacts 78 are loaded into the housing 74 through the rear end of the housing.

Figure 9:
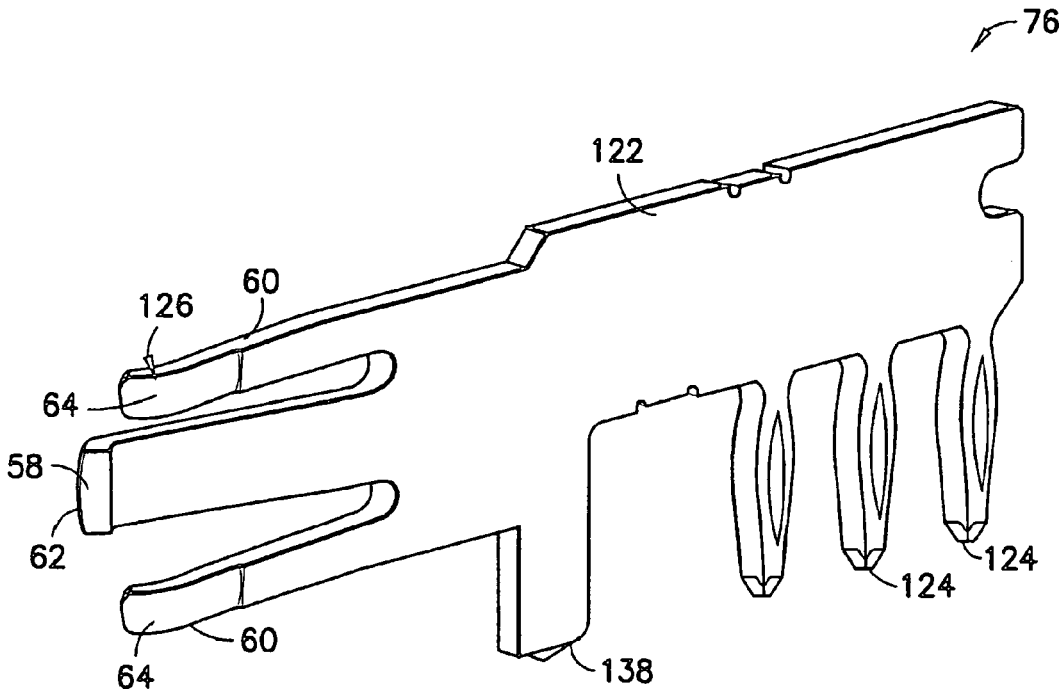
FIG. 9 is a perspective view of a third type of electrical power contact used in the connector shown in FIG. 6.

As seen best in FIG. 9, each third type of power contact 76 generally comprises a main section 122, daughter board electrical contact sections 124, and a mating connector contact section 126. The power contact 76 comprises only one mating connector contact section 126. However, in alternate embodiments, the second type of power contact 76 could comprise more than one mating connector contact section.

The main section 122 comprises a retention section 138 located at a bottom side of the main section. The retention sections engage with the housing 74 to fixedly hold the main section 122 in the housing. In the embodiment shown, the contacts 76 are loaded into the housing 74 through the front end of the housing; through the mating connector receiving area 94.

The mating connector contact sections 106, 126 are identical to each other and to the mating connector contact section 56. However, in alternate embodiments, the mating connector contact sections could be different from each other. When the power contacts 76, 78 are inserted into the housing 74, the mating connector contact sections 106, 126 are located in the mating connector receiving area 94. Each mating connector contact section 106, 126 generally comprises the three forward projecting cantilevered beams; the first beam 58 and the two second beams 60. However, in alternate embodiments, the mating connector contact section could comprise more or less than three cantilevered contact beams.

The first beam 58 extends outward in a first direction as the first beam extends forward from the main section. The first beam 58 has a contact surface 62 facing the first direction. The second beams 60 are located on opposite top and bottom sides of the first beam 58. The second beams 60 extend outward in a second opposite direction as the second beams extend forward from the main section 52. The second beams 60 have contact surfaces 64 facing the second direction.

The beams 58, 60 are bent outward about 15 degrees from a central plain of the power contacts. However, in alternate embodiments, any suitable angle could be provided. In the embodiment shown, the front ends of the beams 58, 60 are curved inward and also comprise coined surfaces on their outer contact surfaces 62, 64. The front ends of the beams 58, 60 could comprise any suitable type of shape.

In a preferred embodiment, the power contacts 76, 78 are comprised of a high-performance copper alloy material. However, in alternate embodiments, other types of materials could be used. As noted above, a highly conductive high performance copper alloy material can have a higher conductivity, but might not be as malleable as other common electrically conductive materials used for electrical contacts. Thus, an electrical contact formed with a highly conductive high-performance copper alloy material might be more difficult to form in a conventional contact stamping and forming die. However, the shape of the mating connector contact sections 56, 106, 126 has been specifically designed to be relatively easily formed by a stamping process even though the stock material used to form the contacts comprises a relatively low malleability, high conductivity high-performance copper alloy material.

A feature of the present invention is the contact geometry at the mating connector contact sections 56, 106, 126. The contact geometry provides the ability to raise or lower the normal force of the contact beams 58, 60 on the contacts 146 by merely lengthening or shortening the length of the beams. The contact geometry requires only minimal forming at the mating interface. This is extremely beneficial for use with relatively low malleability materials, such as some high-performance copper alloys.

Compared to a conventional design, such as disclosed in the U.S. Pat. No. 6,319,075, the contact geometry and the minimized forming needed to be done at the mating interface 56, 106, 126, reduces tooling costs, reduces material costs, maximizes voltage rating, and allows the housing to be designed to permit more air flow through the mated connector system. The header terminal design can be adjusted to optimize the normal force, by adjusting beam length, because of the opposing beam design. Two small beams 60 opposing one larger beam 58 causes the net bending moment on the housing to be minimized.

As noted above, one feature of the present invention is the increased amperage density which can be provided by the power connectors. For example, the second type of connector 24 can provide for 15 amps of current per contact for a total of 60 amps per connector. The bottom side of the connector 24 can be as small as a half-inch, for example, such that the amperage density can be provided at about 60 amps per half inch. This increased amperage density, relative to conventional designs, can be provided due to the higher conductivity of the high performance copper alloy and, due to the increased air flow through the connector housings 26, 74, 144 (see FIGS. 4, 7 and 10).

Also as noted above, another feature of the present invention is the ability for the power connectors to meet specification standards for a given voltage for secondary circuit power card-to-back panel interfaces. More specifically, it has been found that implementation of the present invention can meet the specifications for UL 60950, IEC 61984 and IEC 664-1 for a 150-160 Volt secondary circuit power card-to-back panel connection.

The mother board connection section 18 (see FIGS. 1 and 2) generally comprises a signal connector 140 and two power connectors 142. In the embodiment shown, the three connectors 140, 142 are shown stacked adjacent each other with the signal connector 140 located between the two power connectors 142.

The signal connector 140 generally comprises a header connector with a housing with a plurality of male signal contacts and possibly ground contacts. In a preferred embodiment, the signal connector 140 comprises a Metral™ header connector manufactured and sold by FCI USA, Inc.

Figure 10:
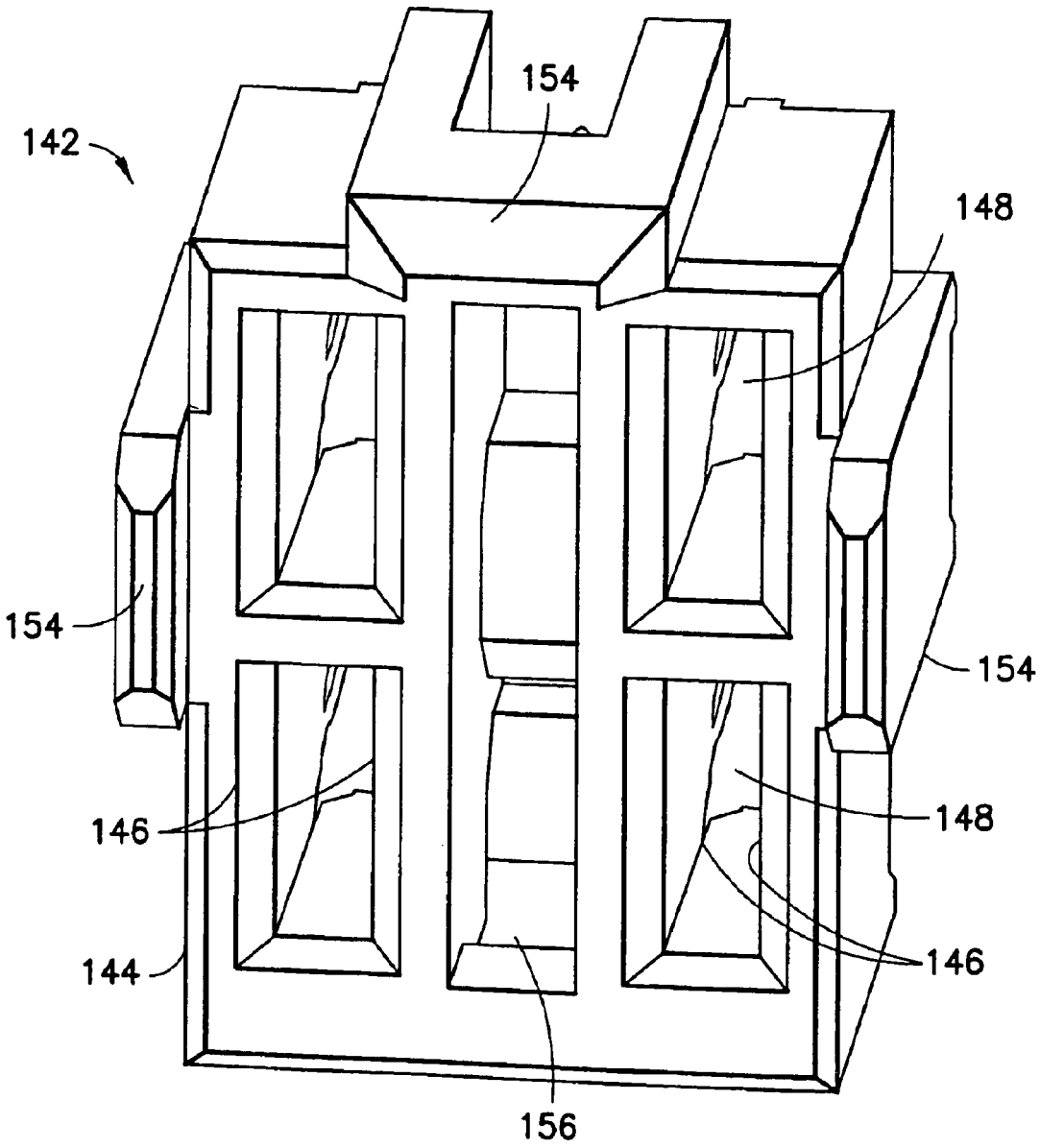
FIG. 10 is a front and top side perspective view of one of the power electrical connectors attached to the mother board shown in FIG. 1.
Figure 11:
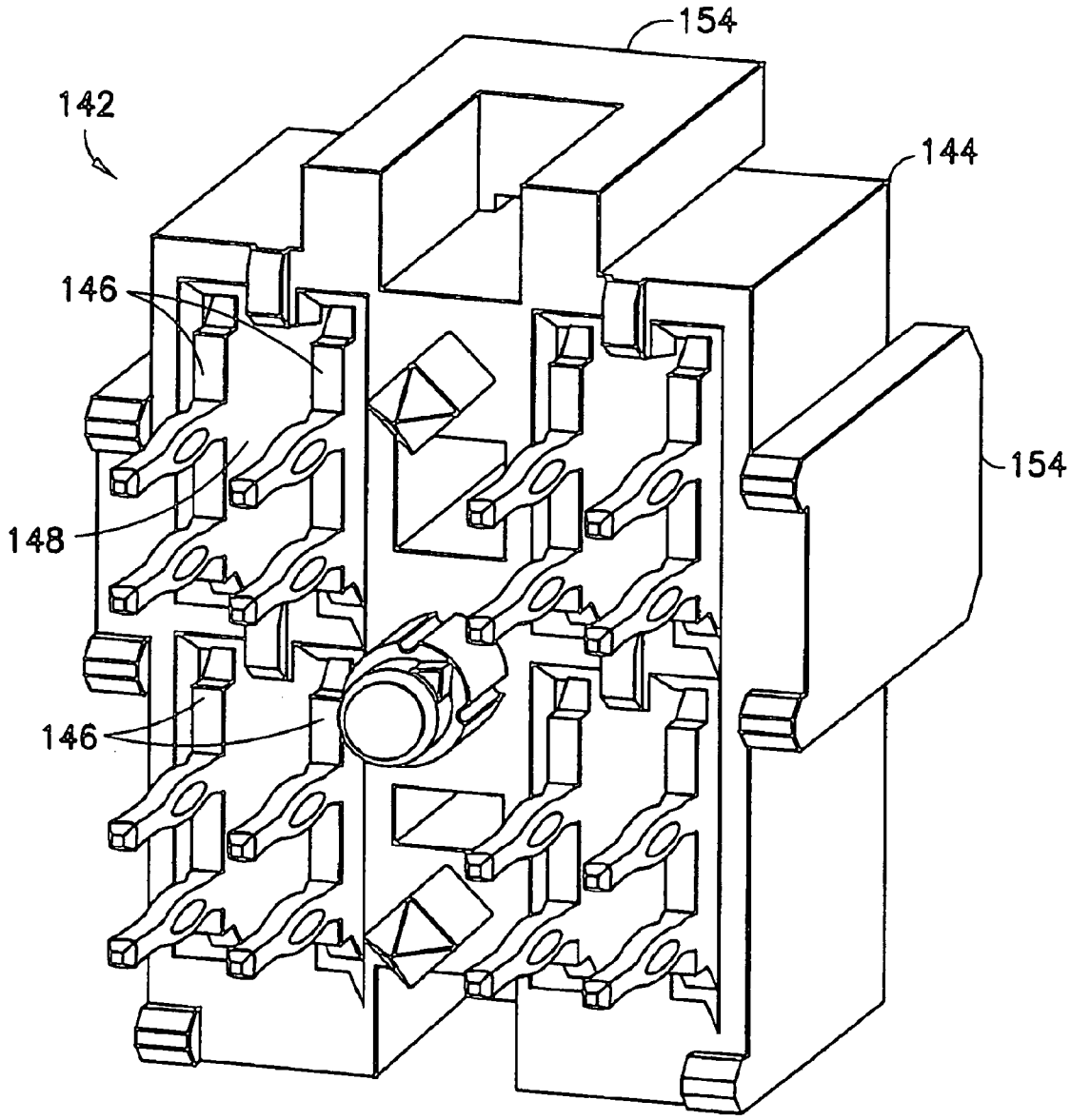
FIG. 11 is a rear and top side perspective view of the power electrical connector shown in FIG. 10.
Figure 12:
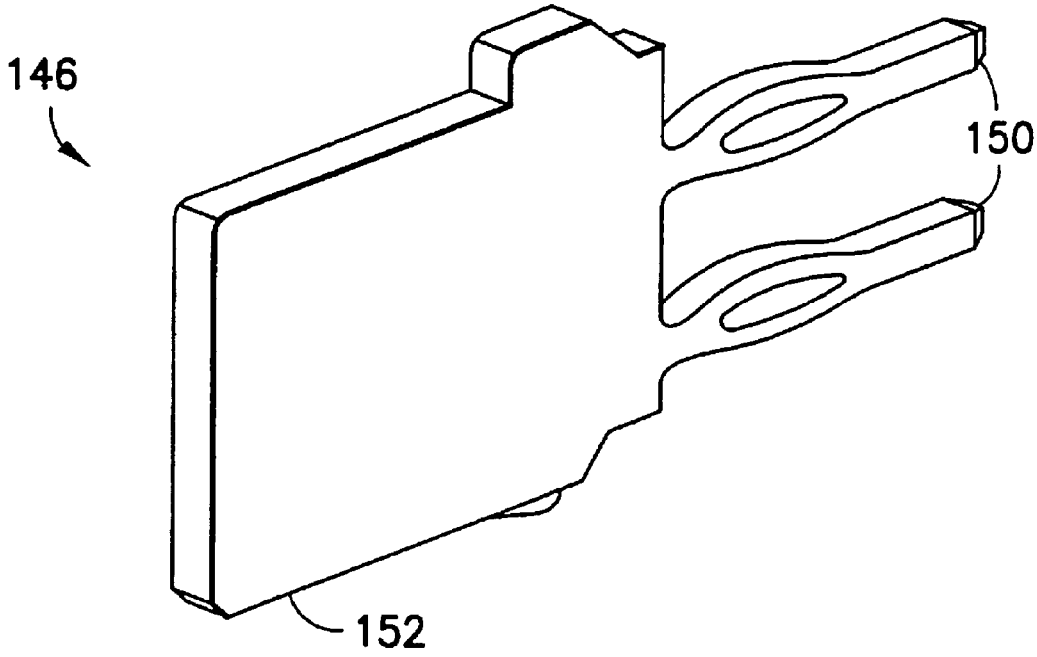
FIG. 12 is a perspective view of one of the power contacts used in the power electrical connector shown in FIG. 10.

Referring also to FIGS. 10-12, the power connectors 142 each generally comprises a housing 144 and electrical power contacts or terminals 146. The housing 142 is preferably comprised of a molded plastic or polymer material. The housing 142 generally comprises four receiving areas 148; one for each of the mating connector contact sections of the connector 22 or 24. However, in alternate embodiments, the housing could comprise more or less than four receiving areas. In the embodiment shown, the housing 144 also comprises three aligners 154 located on three respective sides of the housing and projecting from a front end of the housing. The aligners 154 are sized and shaped to be received in the aligner receiving areas 50, 100 of the connector 22 or 24. The aligners 154 function as protruding guide features to ensure that both mating housings are properly positioned before mating begins.

Top and bottom sides of the housing 144 also comprise holes 156 therethrough. When one of the connectors 22 or 24 are connected to one of the connectors 142, the holes 156 are at least partially aligned with the holes 46, 48, or 96, 98. This allows air to flow through the holes into and out of the mating connector receiving area 44 and inside the connector 142. In a preferred embodiment, the housing 144 is cored to allow for air flow through the mating connector system. The increased air flow allows for increased heat dissipation from the power contacts 28, 76, 78.

In the embodiment shown, the power connector 142 comprises eight of the power contacts 146. However, in alternate embodiments, more or less than eight power contacts could be provided. Each power contact 146 comprises mother board mounting sections 150 and a main section 152. The power contacts 146 are preferably formed from a flat stock material and, after being formed, each power contact 146 comprises a general flat shape.

In the embodiment shown, two of the power contacts 146 are inserted into each one of the receiving areas 148. More specifically, the two power contacts 146 are inserted adjacent opposite sides of each receiving area 148. This forms an area between the two power contacts 146 in each receiving area 148, located between the opposing interior facing contact surfaces of the two power contacts, which is sized and shaped to receive one of the mating connector contact sections 56, 106 or 126.

The present invention provides an inverse connection system. When the daughter board connection section 16 is mated with the motherboard connection section 18, the two signal connectors 20, 140 mate with each other and the two power connectors 22, 24 mate with respective ones of the power connectors 142. The mating connector contact sections 56, 106, 126 project into the receiving areas 148. The contact surfaces 62 of the first beams 58 contact a first one of the pair of power contacts 146, and the contact surfaces 64 of the second beams 60 contact a second one of the pair of power contacts in the same receiving area 148. The first contact beams 58 are deflected slightly inward and the second contact beams 60 are also deflected slightly inward in an opposite direction relative to the first contact beams. Thus, the mating connector contact sections 56, 106, 126 make electrical contact on two inwardly facing sides with the pairs of power contacts in the mating power connector 142.

As seen in comparing the a first type of power contact 28 shown in FIG. 5 to the second and third power contacts 78, 76 shown in FIGS. 8 and 9, the contacts share numerous similarities. In one type of method for forming the contacts, a same metal stamping die is used to form all of the contacts. The apparatus used to stamp the metal stock material includes an optional insert tooling punch which can be inserted into the metal stamping die. The metal stamping die can form the first type of electrical power contact 28 when the insert tooling punch is not inserted into the metal stamping die. However, when the insert tooling punch is inserted into the metal stamping die, then, when the metal stock material is stamped by both the metal stamping die and the insert tooling punch, the second electrical power contact 78 and the third electrical power contact 76 are substantially simultaneously formed from the metal stock material.

Figure 13A:
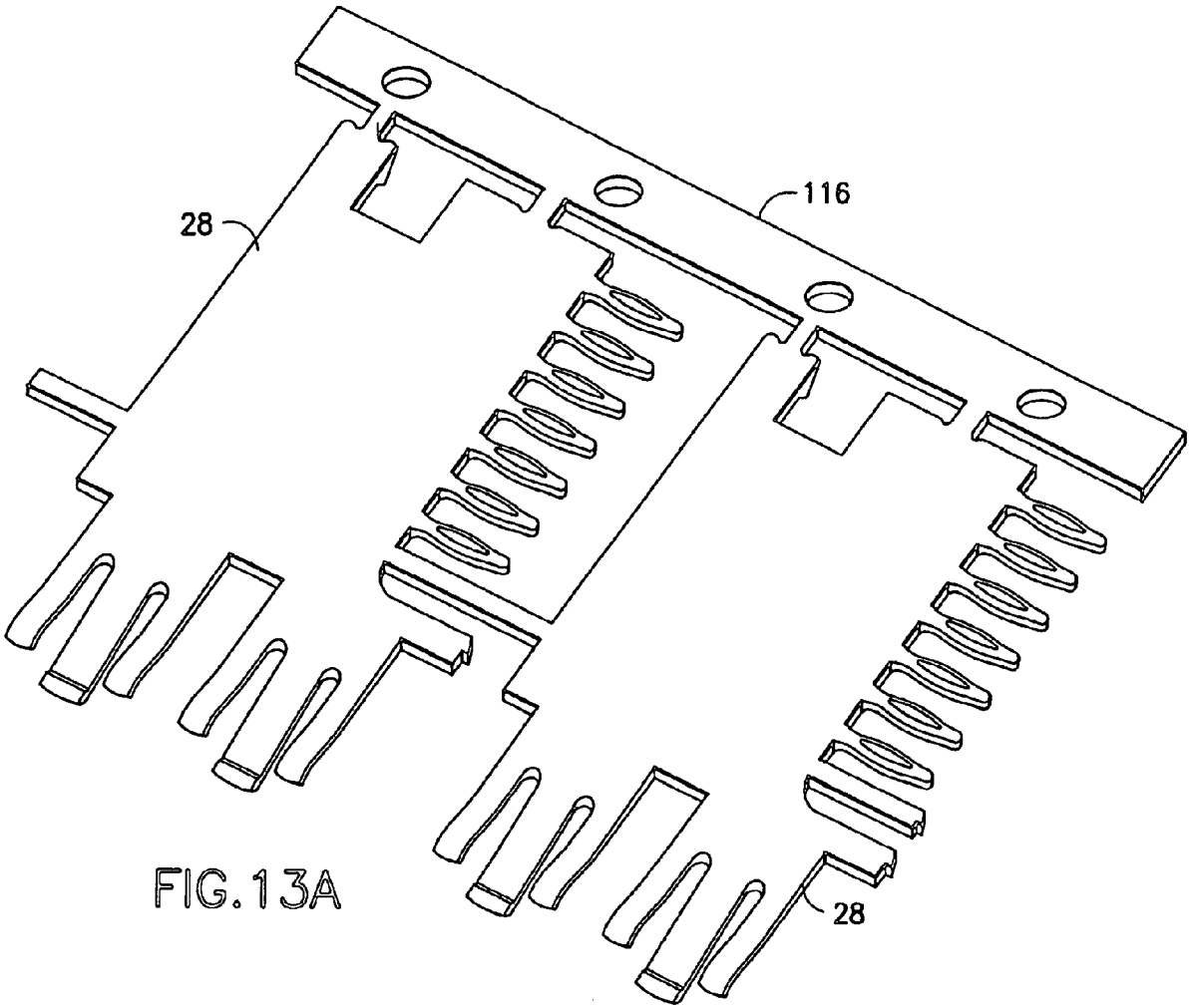
FIG. 13A is a perspective view of two of the first type of contacts formed from metal stock material on a carry strip.
Figure 13B:
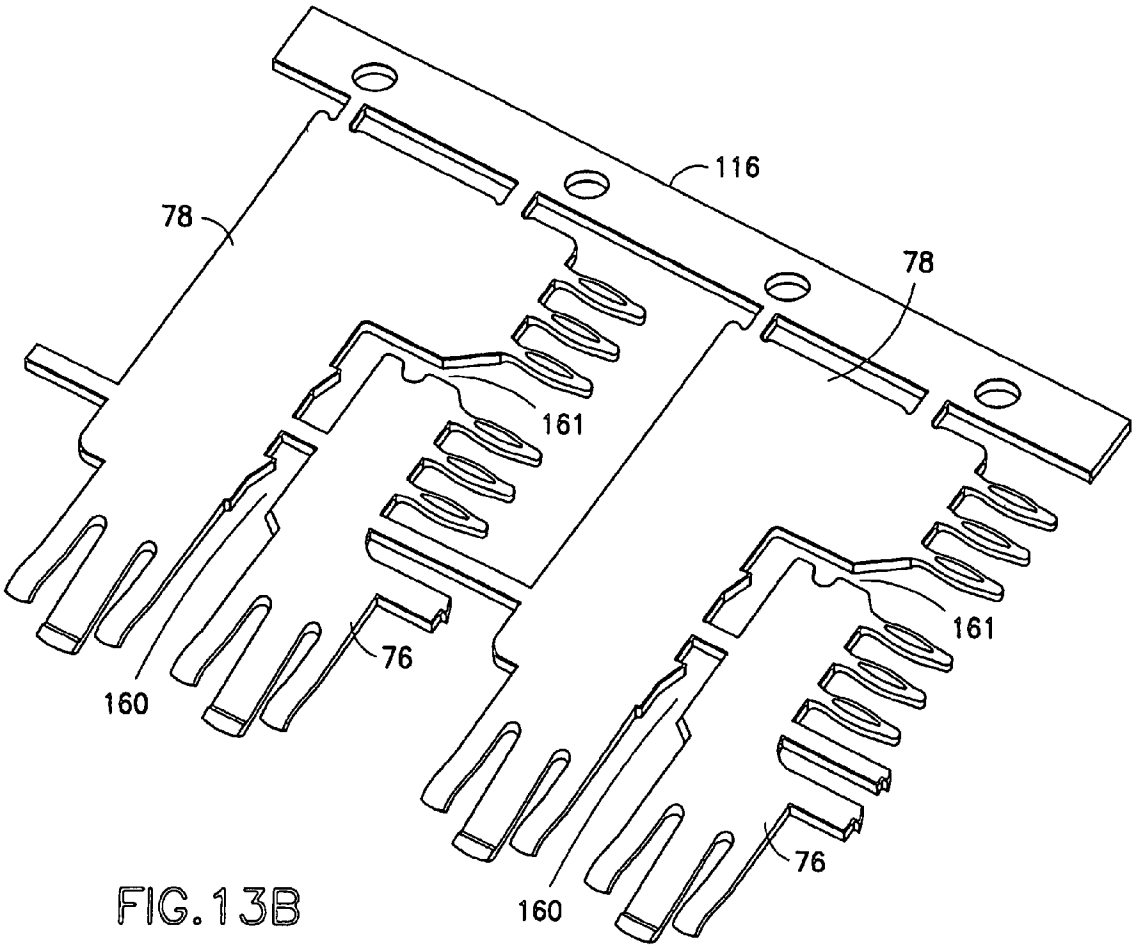
FIG. 13B is a perspective view of two pairs of the second and third types of contacts formed from metal stock material on a carry strip formed with a same metal stamping die as used to form the first type of contacts shown in FIG. 13A and with use of an additional, optional insert tooling punch.

Referring to FIGS. 13A and 13B, FIG. 13A shows a perspective view of two of the first type of contacts 28 formed from metal stock material on a carry strip 116, and FIG. 13B shows a perspective view of two pairs of the second and third types of contacts 76, 78 formed from metal stock material on a carry strip 116 formed with a same metal stamping die as used to form the first type of contacts 28 shown in FIG. 13A and with use of an additional, optional insert tooling punch. The insert tooling punch removes sections 160, 161 to separate the contacts 76, 78. Thus, the metal stamping die and the optional insert tooling punch can be used to form the three different types of electrical power contacts and subsequently form the two different types of electrical power connectors 22, 24.

Figure 14:
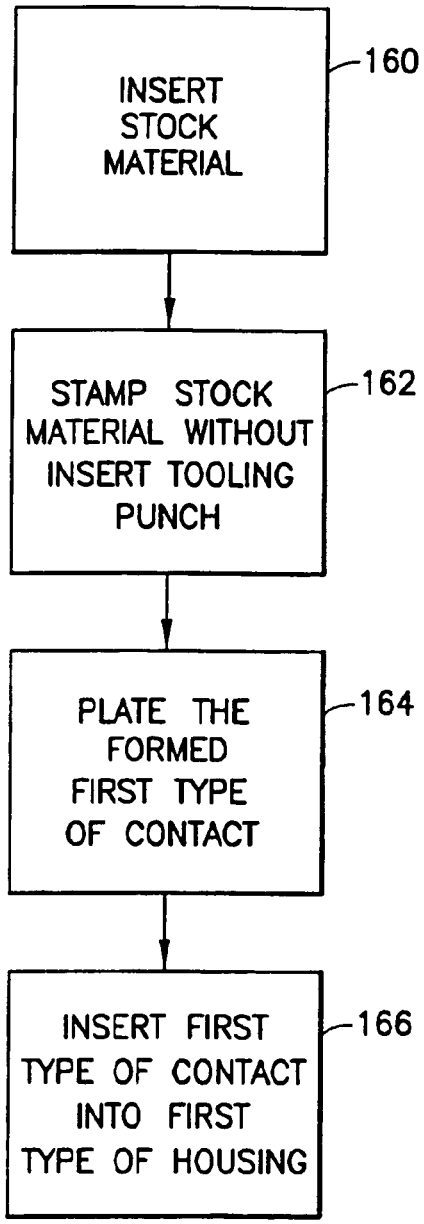
FIG. 14 is a method flow chart of one method of the present invention.
Figure 15:
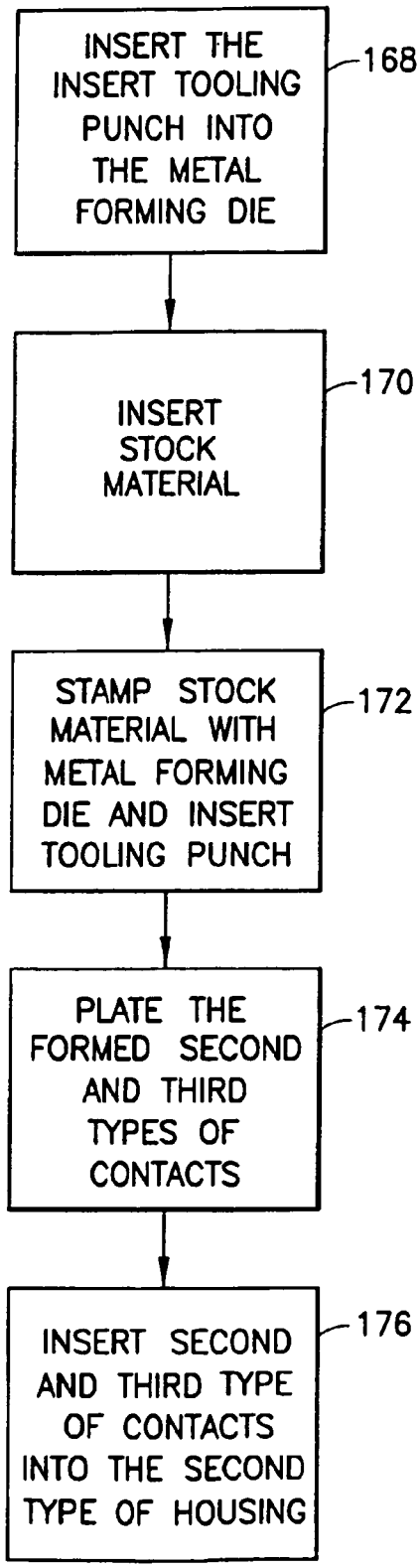
FIG. 15 is a method flow chart of another method of the present invention.

Referring now to FIGS. 14 and 15, this method is illustrated. As shown in FIG. 14, the stock material is inserted 160 into the stamping apparatus. The stamping apparatus then stamps 162 the stock material without the insert tooling punch inserted in the metal stamping die. The formed first type of contact is then plated 164 and inserted 166 into the first type of housing. This forms the first type of connector 22.

FIG. 15 illustrates the steps for forming the second type of connector 24. The insert tooling punch is inserted 168 into the metal stamping die. The stock material is inserted 170 into the stamping apparatus. The stamping apparatus than stamps 172 the stock material with both the metal stamping die and the insert tooling punch. This forms the second and third types of contacts 78, 76 which are subsequently plated 174. The second and third types of contacts are then inserted 176 into the second type of housing to form the second type of power connector 24. This method illustrates merely one form of method that can be used to form power connectors incorporating features of the present invention. In alternate embodiments, any suitable method for forming the power connectors as described above could be used.

The present invention could be embodied or used with other alternate embodiments than described above. For example, the daughter board connection section 16 could comprise more or less than the three connectors, and one or more of the connectors might not be stacked adjacent the other connectors. In addition, in another type of alternate embodiment, the housings for two or more of the connectors might be formed by a one-piece molded housing. The signal connector 20 could comprise any suitable type of signal connector. The air flow passages 36 might not form a majority of a cross sectional size of the rear section 30. The air flow passages 36 in the rear section 30 could also comprise any suitable size and shape. Any suitable system for loading the contacts into the housing could be provided. The front ends of the beams 58, 60 could comprise any suitable type of shape. Features of the present invention could be incorporated into vertical headers, right angle receptacles, and power connectors with different contact arrays other than the 1×2 and 2×2 contact arrays described above.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A printed circuit board electrical power contact for connecting a daughter printed circuit board to a mating contact on another electrical component, the power contact comprising:

a main section;

at least one daughter board electrical contact section extending from the main section; and at least one mating connector contact section extending from the main section, the mating connector contact section comprising at least two forward projecting beams, wherein a first one of the beams extends outward in a first direction as the first beam extends forward from the main section and has a contact surface facing the first direction, and wherein a second one of the beams extends outward in a second opposite direction as the second beam extends forward from the main section and has a contact surface facing the second direction, wherein the first beam is larger than the second beam.

2. A system for connecting a daughter printed circuit board to a mother printed circuit board, the system comprising:

a first power connector adapted to be mounted to the mother printed circuit board, the first power connector having a first housing and first power contacts;

a second power connector adapted to be mounted to the daughter printed circuit board, the second power connector having a plurality of second power contacts, each second power contact having a main section with outwardly bent contact beams having outward facing contact areas, the outwardly bent contact beams comprising a first contact beam which is larger than a second contact beam, wherein the first and second contact beams extend in generally opposite directions from a front end of the main section, and wherein the second power contacts are adapted to be inserted into the first housing;

a first signal connector adapted to be mounted to the mother printed circuit board, the first signal connector comprising male signal contacts; and a second signal connector adapted to be mounted to the daughter printed circuit board, the second signal connector comprising female signal contacts adapted to receive the male signal contacts therein.

3. An electrical contact comprising:

a main section;

a first electrical contact section extending from the main section, wherein the first electrical contact section is adapted to connect to a first device; and a second electrical contact section extending from the main section, wherein the second electrical contact section is adapted to connect to a second device, wherein the second electrical contact section comprises at least two beams projecting from the main section in a connection direction for connecting the second electrical contact section to the second device, wherein a first one of the beams extends outward in a first direction as well as in the connection direction from the main section and has a first contact surface facing the first direction, wherein a second one of the beams extends outward in a second direction as well as in the connection direction from the main section and has a second contact surface facing the second direction, and wherein the first beam is larger than the second beam.

4. An electrical contact as in claim 3 wherein the second direction is generally opposite to the first direction.

5. An electrical contact as in claim 3 wherein the second direction is a lateral direction relative to the connection direction.

6. An electrical contact as in claim 5 wherein the second direction is generally opposite to the first direction.

7. An electrical contact as in claim 3 wherein the second direction is orthogonal to the connection direction.

8. An electrical contact as in claim 7 wherein the second direction is generally opposite to the first direction.

9. An electrical contact as in claim 3 wherein the second electrical contact section comprises two of the second beams.

10. An electrical contact as in claim 9 wherein the two second contact beams are located on opposite sides of the first beam.

11. An electrical contact as in claim 3 wherein the second electrical contact section comprises a pair of two of the second beams for each first beam, and wherein each of the second beams are located at directly opposite sides of their respective first beam.

*12. An electrical connector assembly comprising:*

*a first electrical connector comprising a first housing and a first electrical contact, wherein the first housing comprises at least two first heat dissipation holes extending from an exterior side of the first housing to an interior of the first housing, where the at least two first heat dissipation holes are located on opposite sides of the first housing;*

*a second electrical connector comprising a second housing and a second electrical contact, wherein the second housing comprises at least two second heat dissipation holes extending from an exterior side of the second housing to an interior of the second housing, where the at least two second heat dissipation holes are located on opposite sides of the second housing;*

*wherein the first housing comprises a receiving area adapted to receive at least a portion of the second housing, wherein the first heat dissipation holes extend into the receiving area of the first housing, wherein a first pair of the first and second heat dissipation holes are located on the housings to at least partially vertically align adjacent each other when the second electrical connector is inserted into the receiving area of the first housing, wherein a second pair of the first and second heat dissipation holes are located on the housings to at least partially vertically align adjacent each other when the second electrical connector is inserted into the receiving area of the first housing, where the first pair of heat dissipation holes is aligned substantially unobstructed relative to the second pair of heat dissipation holes for air to flow from the receiving area of the first housing out of the electrical connector assembly.*

*13. An electrical connector assembly as in claim 12 wherein the first housing comprises two of the first heat dissipation holes located at the two opposite sides of the first housing.*

*14. An electrical connector assembly as in claim 13 wherein the second housing comprises two of the second heat dissipation holes located at the two opposite sides of the second housing.*

*15. An electrical connector assembly as in claim 12 wherein the opposite sides of the first housing comprise a top side and a bottom side of the first housing.*

*16. An electrical connector assembly comprising:*

*a first electrical connector comprising a first housing and a first electrical contact, wherein the first housing comprises a first heat dissipation hole extending from an exterior side of the first housing to an interior of the first housing;*

*a second electrical connector comprising a second housing and a second electrical contact, wherein the second housing comprises a second heat dissipation hole extending from an exterior side of the second housing to an interior of the second housing;*

*wherein the first housing comprises a receiving area adapted to receive at least a portion of the second housing, wherein the first heat dissipation hole extends into the receiving area of the first housing, wherein the first and second heat dissipation holes are located on the housings to at least partially vertically align adjacent each other when the second electrical connector is inserted into the receiving area of the first housing where the first and second heat dissipation holes are aligned substantially unobstructed for air to flow from the receiving area of the first housing out of the electrical connector assembly,*

*wherein the first electrical contact comprising:*

*a main section;*

*at least one daughter board electrical contact section extending from the main section; and*

*at least one mating connector contact section extending from the main section, the mating connector contact section comprising at least two forward protecting beams, wherein a first one of the beams extends outward in a first direction as the first beam extends forward from the main section and has a contact surface facing the first direction and wherein a second one of the beams extends outward in a second opposite direction as the second beam extends forward from the main section and has a contact surface facing the second direction, wherein the first beam is larger than the second beam.*

*17. An electrical connector comprising:*

*an electrical contact, wherein the electrical contact comprises;*

*a main section;*

*at least one daughter board electrical contact section extending from the main section; and*

*at least one mating connector contact section extending from the main section, the mating connector contact section comprising at least two forward projecting beams, wherein a first one of the beams extends outward in a first direction as the first beam extends forward from the main section and has a contact surface facing the first direction, and wherein a second one of the beams extends outward in a second opposite direction as the second beam extends forward from the main section and has a contact surface facing the second direction, wherein the first beam is larger than the second beam;*

*a housing having the electrical contact mounted to the housing, wherein the housing comprises a receiving area adapted to receive a portion of a mating electrical connector, wherein the electrical contact extends into the receiving area, wherein the housing comprises heat dissipation holes extending from an exterior side of the housing through different walls of the housing and into the receiving area,*

*wherein the housing is sized and shaped, and the heat dissipation holes are located at predetermined locations on the housing such that at least some of the heat dissipation holes are aligned relative to each other on opposite sides of the housing, and where the heat dissipation holes are located at the predetermined locations on the housings to at least partially vertically align the heat dissipation holes with heat dissipation holes of a mating electrical connector when the mating electrical connector is connected to the electrical connector for the heat dissipation holes to be substantially unobstructed for air to flow from the receiving area of the first housing out of the electrical connector assembly through the aligned heat dissipation holes.*

*18. An electrical connector as in claim 17 wherein the different walls of the housing comprise a top side of the housing and an opposite bottom side of the housing.*

*19. A method comprising:*

*connecting a first electrical connector to a second electrical connector, wherein the first and second electrical connectors each comprise a housing having an interior open space with mating portions of electrical contacts in the open spaces; and*

*when the first and second electrical connectors are being connected to each other, at least partially vertically aligning first heat dissipation holes on the housing of the first electrical connector with second heat dissipation holes of the housing of the second electrical connector as aligned pairs of holes,*

*wherein the heat dissipation holes extend through the housings between exterior sides of the housings and interior open spaces such that heated air can flow from the interior open spaces out of the housings through the aligned pairs of holes, where a first pair of the first and second heat dissipation holes and a second pair of the heat dissipation holes on opposite sides of the housings are aligned substantially unobstructed for the air to flow through the aligned pairs of heat dissipation holes when the electrical connectors are connected.*

*20. A method as in claim 19 wherein the housing of the first electrical connector comprises two of the first heat dissipation holes and the housing of the second electrical connector comprises two of the second heat dissipation holes, wherein the pairs of heat dissipation holes are located on opposite sides of the electrical connectors when the electrical connectors are connected to each other.*

*21. A method as in claim 19 wherein the opposite sides of the housings comprise opposite top and bottom sides of the housings.*

* * * * *

UNITED STATES PATENT AND TRADEMARK OFFICE

CERTIFICATE OF CORRECTION

PATENT NO. : RE44,556 E
APPLICATION NO. : 12/317366
DATED : October 22, 2013
INVENTOR(S) : Steven E. Minich and Christopher J. Kolivoski It is certified that error appears in the above-identified patent and that said Letters Patent is hereby corrected as shown below:

In the Claims

In Claim 16:
Column 12, line 41, “protecting” should be deleted and --projecting-- should be inserted.

In Claim 19:
Column 14, line 11, “and interior” should be deleted and --and the interior-- should be inserted.

Signed and Sealed this
Twenty-fourth Day of December, 2013

Margaret A. Focarino

Margaret A. Focarino
*Commissioner for Patents of the United States Patent and Trademark Office*